(12) United States Patent
Vasconi

(10) Patent No.: US 12,492,549 B2
(45) Date of Patent: Dec. 9, 2025

(54) HOUSING INCLUDING ROOF/COVER ADAPTED WITH RETRACTABLE PANELS IN HINGED CONNECTION TO OUTWARDLY MOVABLE SIDE WALLS

(71) Applicant: VASCONI VENTURES LLC, Albuquerque, NM (US)

(72) Inventor: Nicky J Vasconi, Farmington, NM (US)

(73) Assignee: Vasconi Venture LLC, Albuquerque, NM (US)

( * ) Notice: Subject to any disclaimer, the term of this patent is extended or adjusted under 35 U.S.C. 154(b) by 336 days.

(21) Appl. No.: 18/127,393

(22) Filed: Mar. 28, 2023

(65) Prior Publication Data

US 2023/0349146 A1    Nov. 2, 2023

Related U.S. Application Data

(60) Provisional application No. 63/337,073, filed on Apr. 30, 2022.

(51) Int. Cl.

| | |
|---|---|
| *E04B 1/344* | (2006.01) |
| *B64F 1/222* | (2024.01) |
| *B64U 70/90* | (2023.01) |
| *B66B 9/00* | (2006.01) |
| *B64U 80/10* | (2023.01) |
| *B64U 101/60* | (2023.01) |

(52) U.S. Cl.
CPC .............. *E04B 1/344* (2013.01); *B64F 1/222* (2013.01); *B64U 70/90* (2023.01); *B66B 9/00* (2013.01); *B64U 2101/60* (2023.01)

(58) Field of Classification Search
CPC ..... B64F 1/222; B64U 2101/60; B64U 70/90; B64U 80/10; B66B 9/00; E04B 1/344

USPC .............................................................. 52/66
See application file for complete search history.

(56) References Cited

U.S. PATENT DOCUMENTS

| | | | | |
|---|---|---|---|---|
| 2,098,469 A | * | 11/1937 | Smith .................. | A47D 13/065 52/66 |
| 2,323,106 A | * | 6/1943 | Roy ...................... | E04B 1/3444 296/172 |
| 3,460,297 A | * | 8/1969 | Fritz ........................ | E04H 1/02 D25/29 |

(Continued)

FOREIGN PATENT DOCUMENTS

JP         2002070169 A  *  3/2002

*Primary Examiner* — Brian D Mattei
*Assistant Examiner* — Joseph J. Sadlon
(74) *Attorney, Agent, or Firm* — Luis M. Ortiz; Kermit D. Lopez

(57) ABSTRACT

A housing can include at least one roof panel movably attached to and resting on roof support beams, and movable from a closed position to an open position along the roof support beams to create an opening at a top of the housing. The at least one roof panel can be hinged to a side wall panel that is at rest against vertical support beams when the roof panel is in a closed position. The at least one roof panel and side wall panel can move together as the top panel moves along the roof support beams to create the opening at the top of the housing. A side opening can also be created at a side of the housing associated with the side wall panel when the side panel moves away from the vertical support beams. A lift in the housing can be moved vertically towards the roof opening.

19 Claims, 6 Drawing Sheets

(56) References Cited

U.S. PATENT DOCUMENTS

| | | | | |
|---|---|---|---|---|
| 3,736,708 | A * | 6/1973 | Chapman | E04B 1/3442 52/645 |
| 3,740,088 | A * | 6/1973 | Ratcliff | B60P 3/34 D12/104 |
| 3,833,138 | A * | 9/1974 | Dean | B65D 19/44 108/57.17 |
| 3,941,414 | A * | 3/1976 | Platt | B60P 3/34 296/26.02 |
| 3,971,185 | A * | 7/1976 | Hendrich | E04B 7/24 52/93.2 |
| 4,114,942 | A * | 9/1978 | Greiner | B60P 3/34 296/26.11 |
| 4,567,709 | A * | 2/1986 | Faw | E04B 1/3538 52/745.11 |
| 4,683,902 | A * | 8/1987 | Wilson | E04H 6/04 52/63 |
| 4,751,800 | A * | 6/1988 | Kida | E04B 1/3211 52/66 |
| 4,984,399 | A * | 1/1991 | Taylor | E04H 6/04 160/113 |
| 4,989,379 | A * | 2/1991 | Suzuki | E04B 1/3442 52/66 |
| 5,461,832 | A * | 10/1995 | Smith | E04B 1/3444 52/143 |
| 6,223,479 | B1 * | 5/2001 | Stockli | E04B 1/3444 52/68 |
| 6,243,992 | B1 * | 6/2001 | Gyllenhammar | B60P 3/34 296/26.05 |
| 6,434,895 | B1 * | 8/2002 | Hosterman | B62D 63/061 52/79.5 |
| 6,766,623 | B1 * | 7/2004 | Kalnay | E04B 1/3441 135/147 |
| 6,843,019 | B2 * | 1/2005 | Mercurio | A01G 9/242 52/63 |
| 6,923,498 | B1 * | 8/2005 | Mecham | B60P 3/343 296/210 |
| 7,559,174 | B2 * | 7/2009 | Hoberman | E04B 1/3412 52/66 |
| 7,637,060 | B2 * | 12/2009 | Starheim | E06B 3/7007 296/183.1 |
| 8,015,758 | B2 * | 9/2011 | Meyer-Bretschneider | B64F 1/26 52/65 |
| 8,707,631 | B2 * | 4/2014 | Scouten | E04H 9/14 52/68 |
| 8,943,759 | B2 * | 2/2015 | Warner | E04H 1/12 52/79.5 |
| 9,085,897 | B2 * | 7/2015 | Quine | B66B 9/00 |
| 9,333,820 | B2 * | 5/2016 | Anabtawi | B60D 1/06 |
| 9,334,645 | B2 * | 5/2016 | Thrall | E04B 1/34336 |
| 9,481,458 | B2 * | 11/2016 | Casado | B60L 53/80 |
| 9,499,267 | B2 * | 11/2016 | Ehlert | B66B 9/00 |
| 10,246,869 | B1 * | 4/2019 | Toothman | E02D 27/016 |
| 10,369,975 | B2 * | 8/2019 | Wang | B60L 53/80 |
| 10,457,420 | B2 * | 10/2019 | Heinonen | B60L 53/51 |
| 10,532,815 | B1 * | 1/2020 | Thrun | B64D 11/06 |
| 10,661,916 | B2 * | 5/2020 | Janssen | G08G 5/56 |
| 10,689,111 | B2 * | 6/2020 | Von Gostomski | B64D 1/12 |
| 10,843,573 | B2 * | 11/2020 | Chen | H02J 7/0044 |
| 10,870,498 | B2 * | 12/2020 | Zambelli | E01F 3/00 |
| 11,066,183 | B2 * | 7/2021 | Zosel | B64F 1/35 |
| 11,117,679 | B2 * | 9/2021 | King | G08G 5/22 |
| 11,168,487 | B2 * | 11/2021 | Wankewycz | B64U 80/30 |
| 11,181,933 | B2 * | 11/2021 | Di Benedetto | G05D 1/102 |
| 11,220,816 | B2 * | 1/2022 | Tiramani | B32B 19/046 |
| 11,242,680 | B2 * | 2/2022 | Schambach | E04B 1/344 |
| 11,555,305 | B2 * | 1/2023 | Hariri | E04B 1/34336 |
| 11,603,210 | B2 * | 3/2023 | Tal | B64U 70/90 |
| 11,608,193 | B2 * | 3/2023 | Borko | G06F 3/041 |
| 11,634,221 | B2 * | 4/2023 | Chen | F24H 15/25 244/110 E |
| 11,634,226 | B1 * | 4/2023 | Piedmonte | G06Q 10/083 244/17.13 |
| 11,673,689 | B2 * | 6/2023 | X | B64F 1/222 244/114 R |
| 11,713,136 | B2 * | 8/2023 | Foggia | B64F 1/222 244/114 R |
| 11,738,883 | B2 * | 8/2023 | O'Toole | A47G 29/141 340/946 |
| 11,898,368 | B2 * | 2/2024 | Blake | B60L 53/30 |
| 11,912,438 | B2 * | 2/2024 | Wankewycz | B64F 1/007 |
| 12,030,665 | B2 * | 7/2024 | Svirsky | B64F 1/222 |
| 12,110,677 | B2 * | 10/2024 | Li | E04B 1/3444 |
| 12,180,698 | B2 * | 12/2024 | Bonamour du Tartre | E04B 1/26 |
| 12,234,641 | B2 * | 2/2025 | Jiang | E04B 7/166 |
| 12,300,054 | B2 * | 5/2025 | Carter | B64D 1/10 |
| 2002/0083654 | A1 * | 7/2002 | Bini | E04B 1/3533 52/79.5 |
| 2002/0129564 | A1 * | 9/2002 | Park | E03C 1/00 52/64 |
| 2008/0134588 | A1 * | 6/2008 | Knight | E04B 1/34815 52/79.5 |
| 2015/0175276 | A1 * | 6/2015 | Koster | A47G 29/14 244/114 R |
| 2017/0217696 | A1 * | 8/2017 | Lanigan, Sr. | B65G 63/025 |
| 2017/0370091 | A1 * | 12/2017 | Dragan | E04B 1/3511 |
| 2018/0134412 | A1 * | 5/2018 | Poh | B64U 80/25 |
| 2021/0040723 | A1 * | 2/2021 | Lin | E04B 1/348 |
| 2023/0106634 | A1 * | 4/2023 | Dunne | E04B 1/345 52/79.5 |
| 2023/0415997 | A1 * | 12/2023 | Fosnight | B64C 39/024 |
| 2024/0011282 | A1 * | 1/2024 | Schambach | E04B 1/3511 |
| 2024/0175253 | A1 * | 5/2024 | Zhou | E04B 1/3444 |
| 2024/0200322 | A1 * | 6/2024 | Chen | E04B 1/3442 |

* cited by examiner

HOUSING INCLUDING ROOF/COVER ADAPTED WITH RETRACTABLE PANELS IN HINGED CONNECTION TO OUTWARDLY MOVABLE SIDE WALLS

INVENTION PRIORITY

This application is a continuation of U.S. Provisional Patent Application No. 63/337,073, filed Apr. 30, 2022, entitled "HOUSING INCLUDING ROOF/COVER ADAPTED WITH RETRACTABLE PANELS IN HINGED CONNECTION TO OUTWARDLY MOVABLE SIDE WALLS", which is incorporated by reference herein in its entirety.

TECHNICAL FIELD

The embodiments described herein are generally related to housing structures, containers or buildings with retractable roofs/covers. More particularly, the embodiments are related to a housing including roof/cover panels that are retractable and that are hinged to side walls of the housing, wherein both the roof/cover panels and side walls move to create an opening at the top of the housing as well as at sides of the housing.

BACKGROUND

Retractable roofs have been built into large venues, such as sports stadiums. For example, many modern professional football stadiums in the United States have roofing structures that can be electromechanically moved from a closed to an open position to create an opening at the top of the sports venue. The opening creates a more comfortable environment for occupants of the venue.

There is also a need for smaller scaled housing with covers or roofs that can be opened. For example, an opened roof in a garage can allow for a vehicle to be raised up on a lift without worrying about headroom within the garage. There is also a growing need for housing that can receive aerial autonomous vehicle, such as drones, and packages that may be delivered by such aerial autonomous vehicles. Drone recovery and drone-delivered package receipt are new and growing fields without many housing options being presented. Furthermore, should aerial vehicles be received within a housing, gases or air pressure can be created that would need to be discharged. Smaller scaled housing can include applications such as cooking appliances or security containers.

The present inventor herein discloses solutions to meet the growing need in the art of housing with roofs that can be selectively opened and closed. Also disclosed are means to discharge gases created by aerial vehicles entering or hovering above such a housing, or to discharge gases from material contained within the housing.

SUMMARY OF THE EMBODIMENTS

In a first embodiment, a housing is described that includes at least one roof panel or cover that is hinged to a side wall of the housing, wherein both the roof panel/cover and side wall are movable together to create an opening at the top of the housing.

In accordance with another feature of the first embodiment, a side opening can also be created at a side of the housing associated with the side wall panel when the side panel moves away from the vertical support beams.

In accordance with another feature of the first embodiment, a housing can include at least one roof panel movably attached to and resting on roof support beams, and can be moved from a closed position to an open position along the roof support beams to create an opening at a top of the housing, the at least one roof panel can be hinged to a side wall panel that is at rest against vertical support beams when the roof panel is in a closed position, and the at least one roof panel and side wall panel can move together as the top panel moves along the roof support beams to create the opening at the top of the housing. A side opening can also be created at a side of the housing associated with the side wall panel when the side panel moves away from the vertical support beams. An optional lift in the housing can be moved vertically towards the opening.

In accordance with another feature of the first embodiment, a lift can be included in the housing and can be moved vertically towards the opening.

In accordance with another feature of the embodiments, the lift can be configured to receive airborne vehicles and/or delivered packages through the opening.

In accordance with another feature of the embodiments, the lift can be configured to raise vehicles and/or material up to the opening.

In accordance with another embodiment, a housing is described that includes two roof panels that are each hinged to separate side wall panels of the housing, and the roof panels are configured to move apart (i.e., outward) from each other, while also causing the side wall panels to also move away from vertical support beams of the housing that they normally lay at rest against when the roof panels are together (e.g., closed), outward movement of the roof panels creating an opening at the top of the housing.

In yet another embodiment, an opening at the top of the housing caused by movement of the roofs panels enables at least one of: receipt of an airborne vehicle into the housing, receipt of packages delivered by airborne vehicles into the housing, and extra height above a ground floor within the housing for movement upward of materials, vehicles or people.

In another embodiment, a housing is described that includes at least one roof panel that is hinged to a side wall of the housing and a lift, wherein roof panels and side walls are movable together to create an opening at the top of the housing and the lift can be selectively raised and lowered within the housing toward the opening created at the roof. The opening at the roof for receiving airborne vehicles and/or packaged and the opening at the side panels allow for ventilation where the side wall moves away from vertical support beams of the housing. The side opening enabling air generated by an airborne vehicle to exit from inside the housing.

In another embodiment, a housing with two spaces, A and B, is described that includes one roof panel that is hinged to a side wall of the housing and a lift associated with space B, wherein roof panel and side wall are movable together to create an opening at the top of the housing over space B and the lift can be selectively raised and lowered within the housing at space B toward the opening created at the roof over space B, wherein the opening at the top of the housing at space B can receive airborne vehicles and/or packages, provide extra headroom within the housing for raising materials or vehicles upward from a ground floor within the housing at space B on the lift in space B, and ventilation can be created at space B where the side wall moves away from vertical support beams in space B of the housing which can further create areas from which air generated by an airborne vehicle can exit from inside the housing in space B.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a distinct embodiment of the invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims. Each of the embodiments will now be described in greater detail below, including specific embodiments, versions and examples, but the inventions are not limited to these embodiments, versions or examples, which are included to enable a person having ordinary skill in the art to make and use the inventions when the information in this patent is combined with available information and technology. Reference to the term "hingedly" refers to the connection of an end of a panel to either another panel or a floor by a hinge, or the like. When referring to a roof panel, the term "roof panel" or "roof" should also be broadly interpreted to include a cover, whether the cover is represented by one or two panels, given the scalability of the housing described with respect to the various embodiment. A "housing" as referred to herein can be as large as an aviation hanger down to the housing of a small safe or cooking appliance such as an oven. Teaching of a "housing" and some of its aspects as described herein are not meant to be limited.

Figure 1:
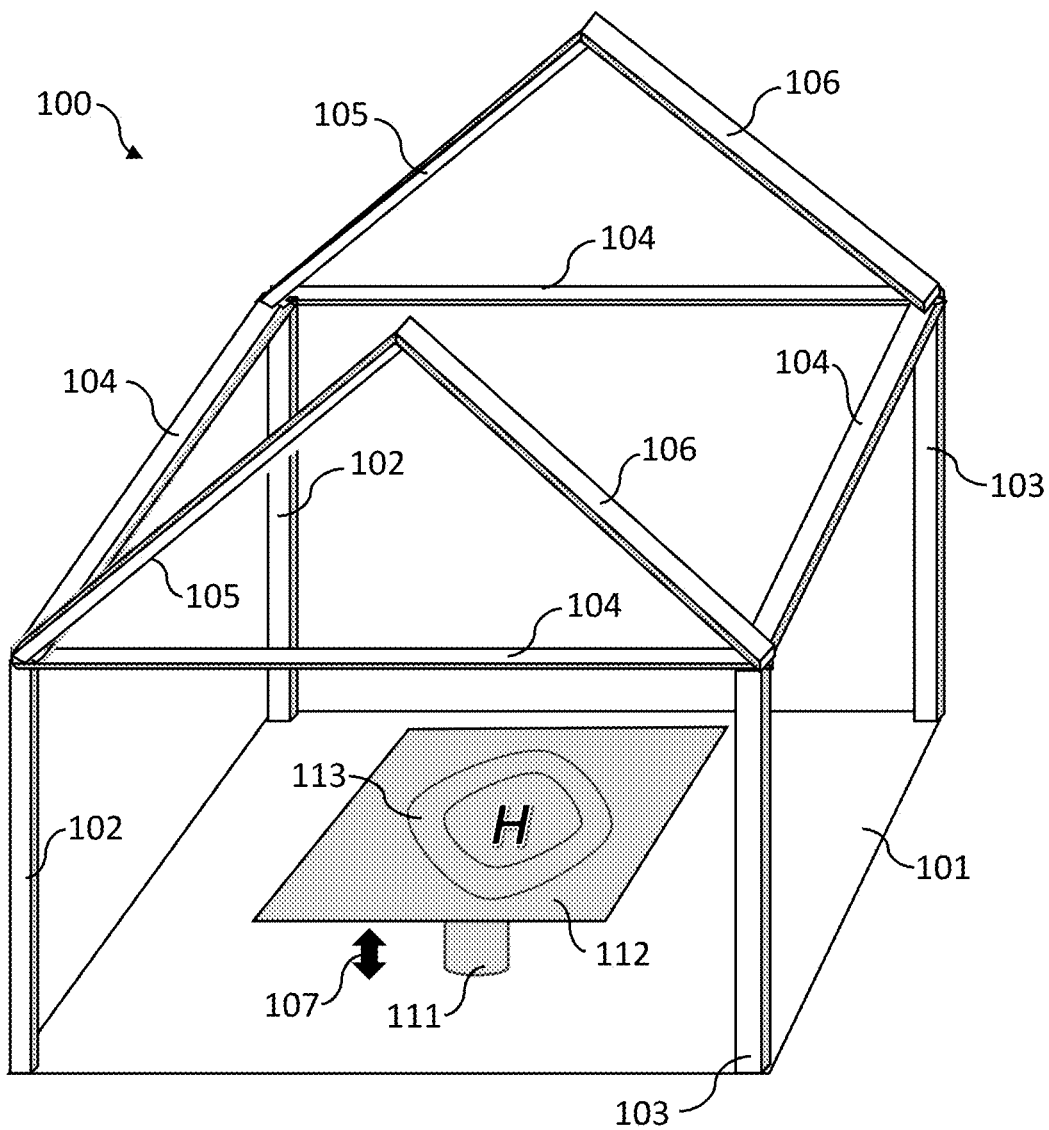
FIG. 1, depicts a top, right side view of support framework for a housing and an optional lift installed therein, according to one or more embodiments described, according to one or more embodiments described.

Referring to FIG. 1, depicted is a top, right side view of support framework for a housing 100 and an optional lift 112 installed therein, according to one or more embodiments described. The support framework can include vertical support beams 102/103 extending upward from a floor 101 to horizontal support beams 104 connecting the vertical support beams 102/103. Roof support beams 105/106 can then extend into a pitch from the vertical support beams 104. It should be appreciate that the the housing is not limited to a pitched roof, and a flat roof (or roof of various angles) can be interchanged with a pitched roof. The vertical support beams 102/103, horizontal support beams 104, and roof support beams 105/106 can be made from metal and can be welded together using known welding techniques in order to create a stable housing structure. It can be appreciated that other materials, such as wood, can be used and constructed by means and methods known in the construction art. Also shown in FIG. 1 is a lift platform 112 that can be optionally included in a housing structure 100 to lift upwards near and between the roof support beams 105/106. A lift platform 112 can include one or more extending posts 111. Indicia 113 can also be provided on (e.g., printed or painted on) the lift platform 112 to identify the platform 112 to aerial vehicles (see FIG. 2, drone 290) approaching or hovering above the housing 100 when the lift platform 112 is raised up by the one or more extending posts 111. There are a variety of lift designs that can be utilized for purposes of providing the lift illustrated by lift platform 112 and extending post 111 in FIG. 1. For example, there are single, double and four post extending lifts used to lift vehicles within a garage. Lifts can be electromechanically and hydraulically manipulated into extended (up) and retracted (down) positions as indicated by arrow 107.

Figure 2:
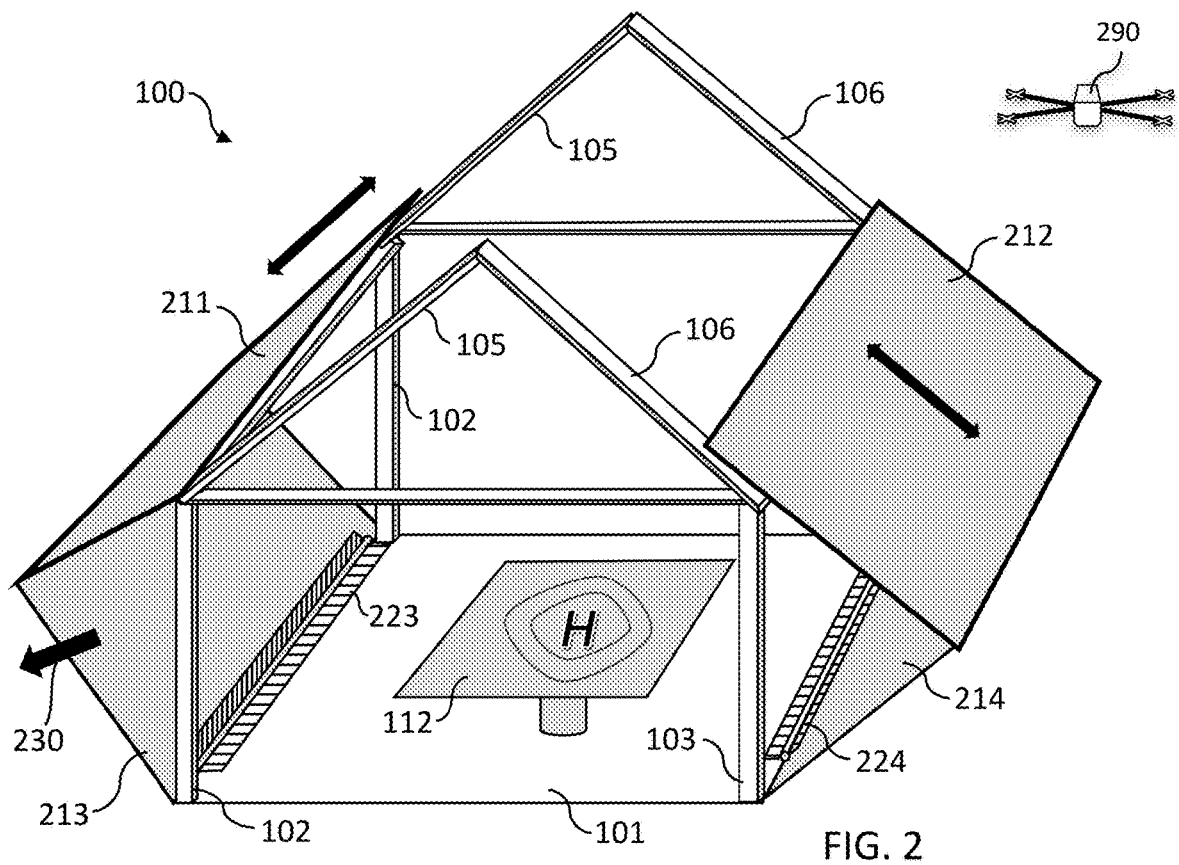
FIG. 2, depicts a top, right side view of the support framework for a housing depicted in FIG. 1 with roof panels movable over roof support beams and side panels attached to the roof panels, the roof panels separated apart from each other creating an opening at the top of the housing and further creating vent ports where the side panels separate from vertical support beams that comprise of part of the framework for the housing, according to one or more embodiments described.

Referring to FIG. 2, depicted is a top, right side view of the support framework for the housing 100 depicted in FIG. 1 with roof panels 211/212 being movable over roof support beams 105/106 into open and closed positions. Also shown are side panels 213/214 hingedly attached to roof panels 211/212, respectively (i.e., side panel 213 attached to roof panel 211, and side panel 214 attached to roof panel 212). The roof panels 211/212 can be mechanically (manual or electromechanically) moved apart to create an opening at the top of the housing 100 as shown in FIG. 1. As the roof panels are moved into open position, their associated side panels 213/214 also move away from vertical support beams 102/103 that the side panels 213/214 can normally rest against when the roof panels 211/212 are closed and in contact with each other. When the side panels 213/214 are moved away from their respective vertical support beams 102/103, an opening is created wherein gas from inside the housing 100 can be discharged/vented as shown by arrow 230. Gas (e.g., air pressure) can be created when a drone 290 enters the housing 100. A drone can enter at the opening created at the top of the housing structure by the parted roof panels 211/212 and can land on a platform 112 that can be lifted towards the opening by at least one extending post 111. Also shown in FIG. 2 are hinges 223/224 which can hingedly attach side panels 213/214 to the floor 101. Similar hinge connections can be used to connect the roof panels 211/212 with side panels 213/214, as will be explained in FIG. 3.

Figure 3:
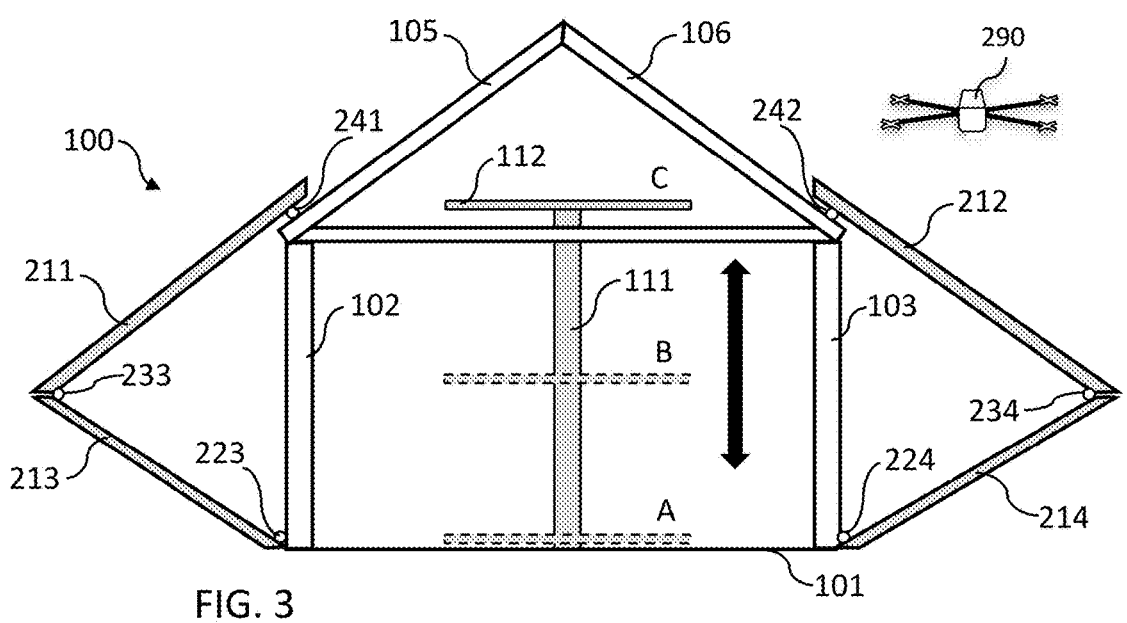
FIG. 3, depicts a front view of the support framework, roof panels and side panels for a housing depicted in FIG. 2, the lift is shown movable at various heights (A-C) within the housing, according to one or more embodiments described.

Referring to FIG. 3, depicted is a front view of the support framework (vertical support beams 102/103, horizontal support beams 104, roof support beams 105/106) for the housing 100 depicted in FIG. 2. The platform 112 for the lift is shown being raised by extending post 111 to a level C. The platform is also shown to be movable to various heights (A-C) within the housing 100, wherein level A is with the platform 112 at rest on the floor 101 of the housing 100, level B is a midpoint within the housing 100, and C is near the opening created by roof panels 211/212 between roof support beams 105/106. It is at level C that a drone 290 can easily enter the housing 100 and rest on the platform 112. It is during landing, or coming to rest, on the platform 112 that air pressure can be created and can be discharged by the opening created when the side panels 213/214 are moved away from vertical support beams 102/103. Side panels 213/214 are shown hingedly connected to roof panels 211/212 by hinges 233/234. Also shown are hinges 223/224 hingedly connecting side panels 213/214 to the floor. Also shown in FIG. 3 are rollers 241/242 disposed between roof support beams 105/106 and roof panels 211/212. The rollers 241/242 that can be provided to facilitate movement of the roof panels 211/212 along the roof support beams 105/106 during opening and closing procedures.

Figure 4:
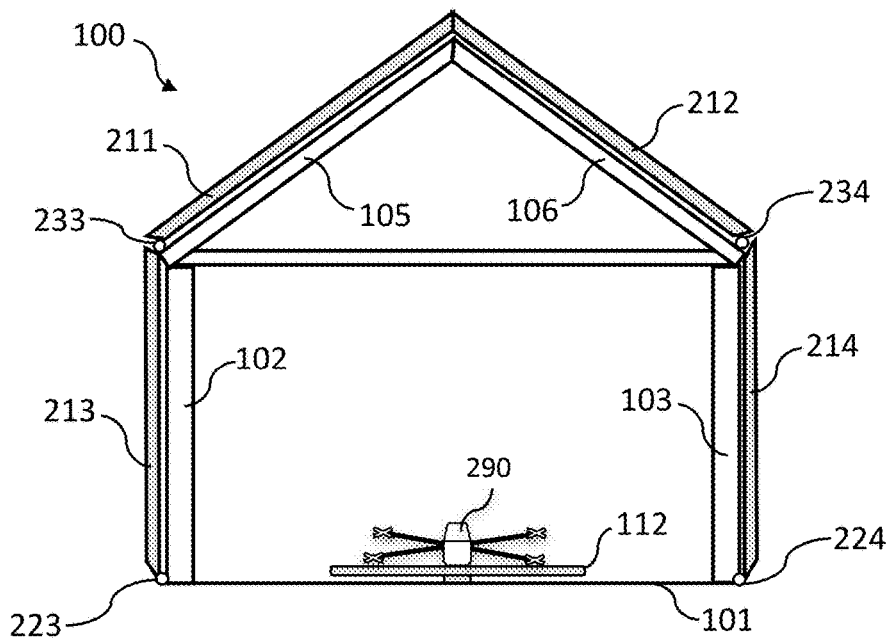
FIG. 4, depicts a front view of the housing in FIG. 3, with roof panels and side panels in a closed position over the housing and against the framework, and a drone stored inside the housing at rest on top of a lift, according to one or more embodiments described.

Referring to FIG. 4, depicted is another front view of the housing 100 in FIG. 3, with roof panels 211/212 and side panels 213/214 in their closed position over and against the roof support beams 105/106 and vertical support beams 102/103, respectively. A drone 290 is shown resting on top of platform 112 within the housing 100, the platform 112 being in its retracted position (at rest on the floor 101).

Figure 5:
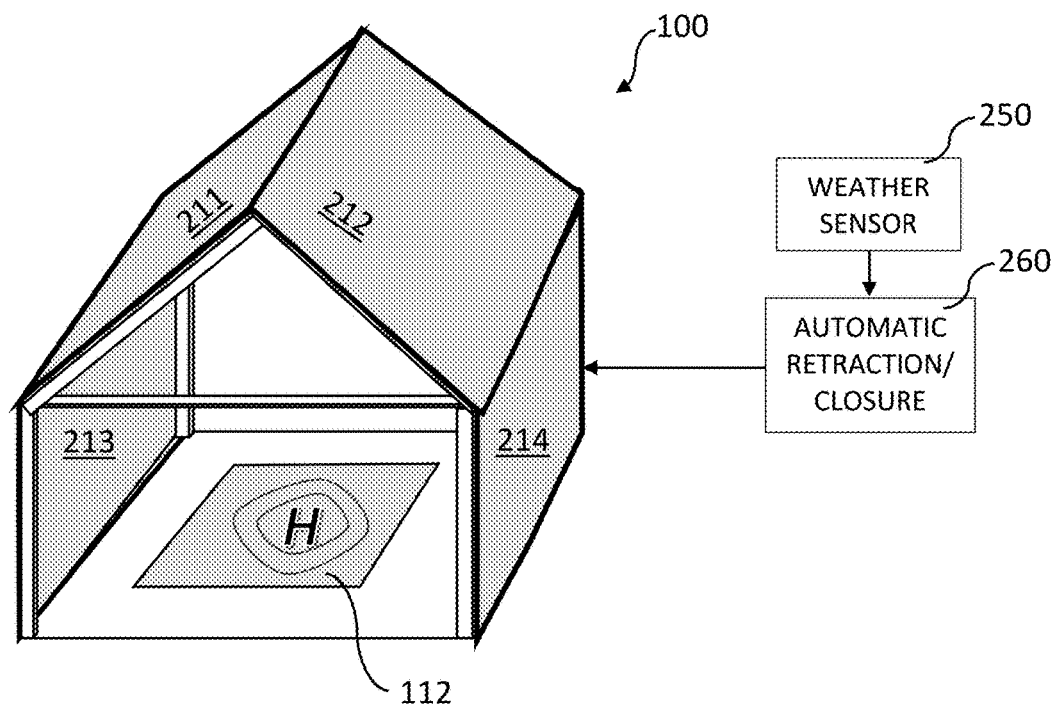
FIG. 5, depicts a top, side view of a housing as in FIG. 3, with roof panels and side panels in a closed position over the housing containing a lift, a weather sensing device coupled to automatic retraction/closure hardware to facilitate lowering of the lift and closure of the roof panels and side panels in reaction to a particular signal from the weather sensor, according to one or more embodiments described.

Referring to FIG. 5, depicted is a top, side view of a housing 100 as shown in FIGS. 1-4, with roof panels 211/212 and side panels 213/214 in their closed position over the housing 100 containing a lift platform 112. A weather sensing device 250 can be coupled to automatic retraction/closure hardware 260 to facilitate lowering of the lift platform 112 and closure of the roof panels 211/212 and side panels 213/214 in reaction to a particular signal from the weather sensor 250. For example, a rain sensor can be incorporated into weather sensing device 250 to detect if it is raining. If so, the platform 112 can be retracted and the housing 100 can be closed. An anemometer can also be (or alternatively be) included in the weather sensing device 250 to detect if there is wind speed higher than a threshold that is safe for the roof panels 211/212 to be in their opened position. Furthermore, data from weather reporting services can be received and processed by weather sensing device 250 and cause closure of the roof panels 211/212 under certain threatened conditions (e.g., high winds, tornado warning). Automatic retraction/closure hardware 260 can electromechanically or hydraulically manipulate the roof panels 211/212, and thereby the side panels 213/214, into their closed positions.

Figure 6:
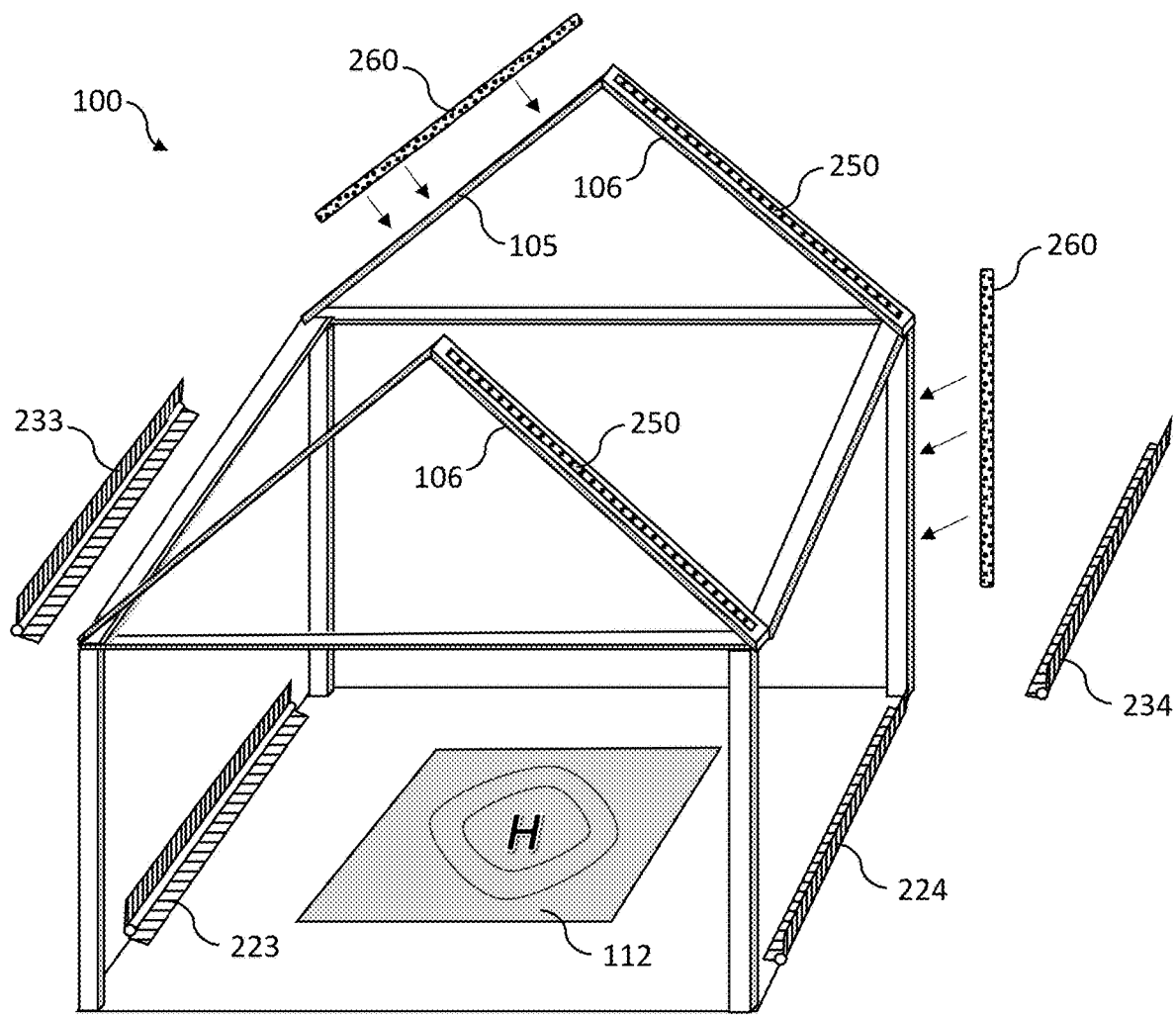
FIG. 6, depicts a top, side view of support framework, hinges adapted for use with roof panels, hinges adapted for use with side panels to connect to roof panels, insulation material for use between roof/side panels and framework, and a lift, according to one or more embodiments described.

Referring to FIG. 6, depicted is a top, side view of support frameworks of housing 100. Hinges 223/224 are shown attached to the floor 101 and can be attached to side panels 213/214. Hinges 233/234 can be used to attach side panels 213/214 to roof panels 211/212, respectively. Also shown is insulation material 260 that can be attached to vertical support beams 102/103 and roof support beams 105/106 to create a seal between the side panels 213/214 and vertical support beams 102/103 and the roof panels 211/212 and roof support beams 105/106 when the housing is closed in order to create a weather seal. Alternatively, the insulation material can be attached to the side panels and roof panels where they contact the vertical support beams 102/103 and roof support beams 105/106 to create a weather seal. Also shown in FIG. 6 are tracks 250 mounted on roof support beams 106. Similar tracks can be mounted to roof support beams 105. The tracks 106 can keep the roof panels 211/212 movably attached to the roof support beams 105/106 when in closed, opening or opened positions.

Figure 7:
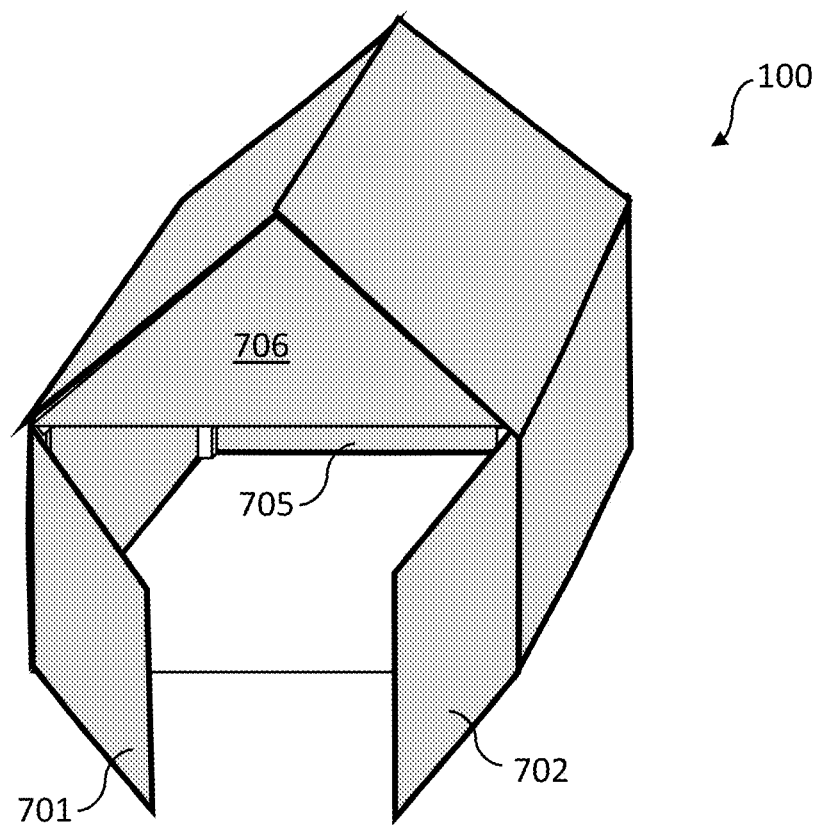
FIG. 7, depicts a top, side view of a housing including swing doors, a rear panel and upper pitch area panel for enclosing the housing, according to one or more embodiments described.
Figure 8:
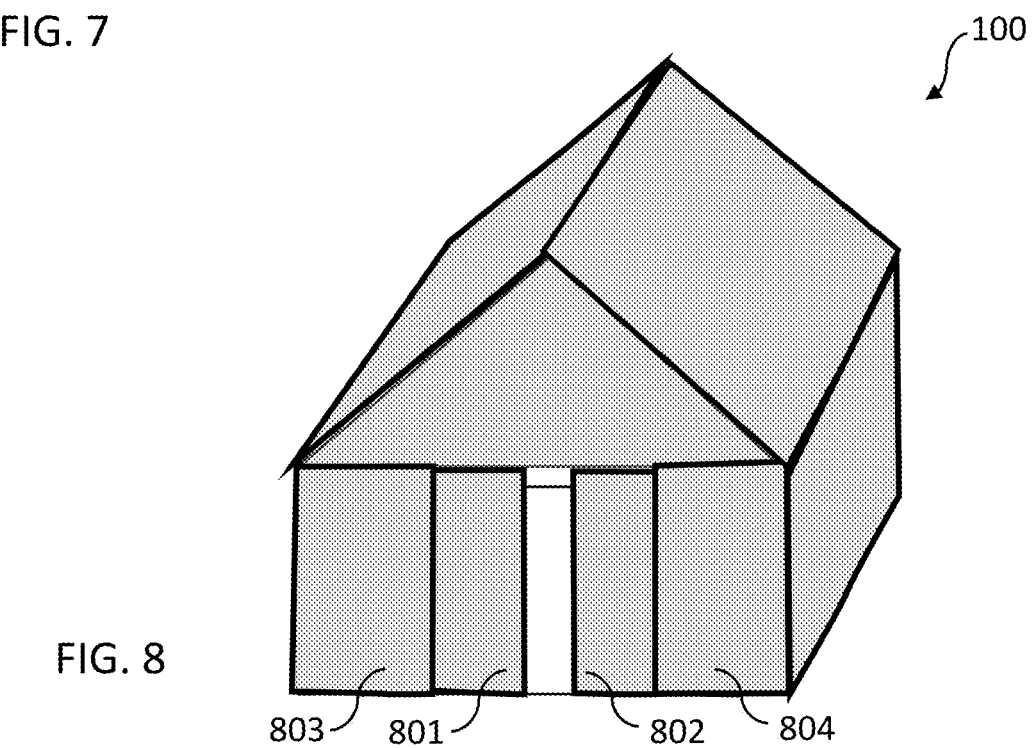
FIG. 8, depicts a top, side view of a housing including optional rolling barn doors for enclosing the housing, according to one or more embodiments described.

Referring to FIG. 7, depicted is a top, side view of a housing 100 including swing doors 701/702 that can be attached to vertical support beams 102/103. Also shown is a rear panel 705 and upper pitch area panel 706 (another would be located at the rear of the housing above the rear panel 705) to complete enclosure of the housing 100. It should be noted that all panels can be constructed from metal, wood, plastics and other materials known in the art. Insulation and other finishes can be provided that are well known the construction art. Referring to FIG. 8, depicted is a top, side view of a housing 100 including optional rolling barn doors 801/802 for enclosing the housing 100. Rolling barn doors 801/802 would typically roll behind fixed front panels 803/804 as shown. Other doors can be utilized in place of those illustrated, for example roll-up doors typical for use with garages can be utilized for closure of the front of the housing 100.

Figure 9:
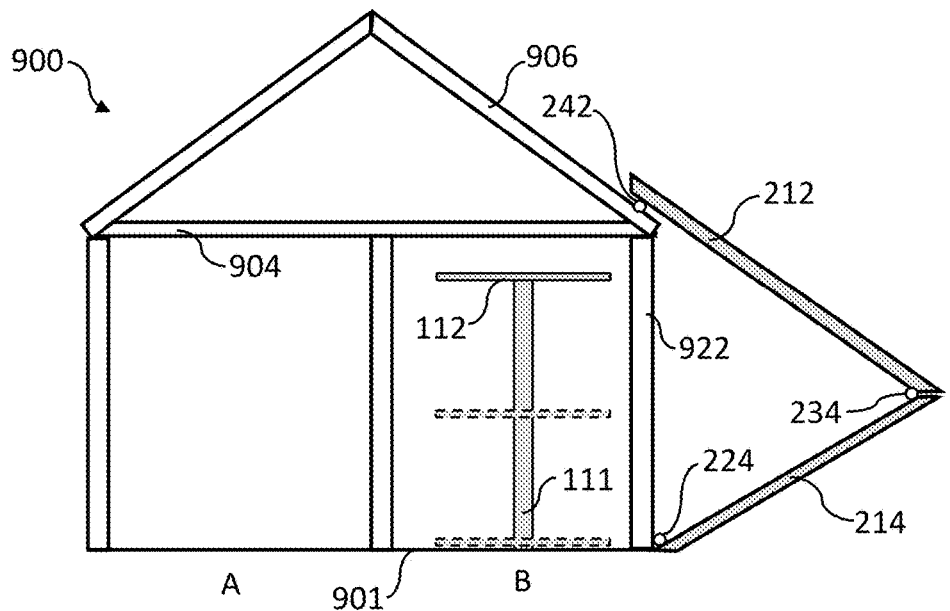
FIG. 9, depicts a front view of support framework for a housing that includes two separate spaced A and B, wherein a lift and retractable roof is only utilized in space B, and an optional lift in only installed in section B, according to another embodiment described.

Referring to FIG. 9, depicted is a front view of support framework for a housing 900 that includes two separate spaces A and B. Separate spaces could be utilized wherein an office is needed (space A) that has an adjoining shop (space B). It such a configuration, a lift platform 112 can be included in the shop area (space B). With this scenario, only one side and space of the housing 900 over space B may require that the roof can be opened in order to allow extra headroom clearance for raising vehicles under repair, or for receiving incoming drones or packages, as previously described. Under these circumstances, only one retractable roof panel 212 may be necessary. As shown in FIG. 9, roof panel 212 is movable over roof support 906 on roller 242. Side panel 214 can be hingedly connected by hinge 234 to roof panel 212 and moves outward and away from vertical support panel 922. Side panel can also be hingedly connected to floor 901 by hinge 224. If an optional lift is provided within space B, Lift platform 112 can be lifted by extending post 111 to various levels within space B. Side panel 214 in space B is the only panel that needs to be utilized for roof panel 212 support and for venting as earlier described.

Figure 10:
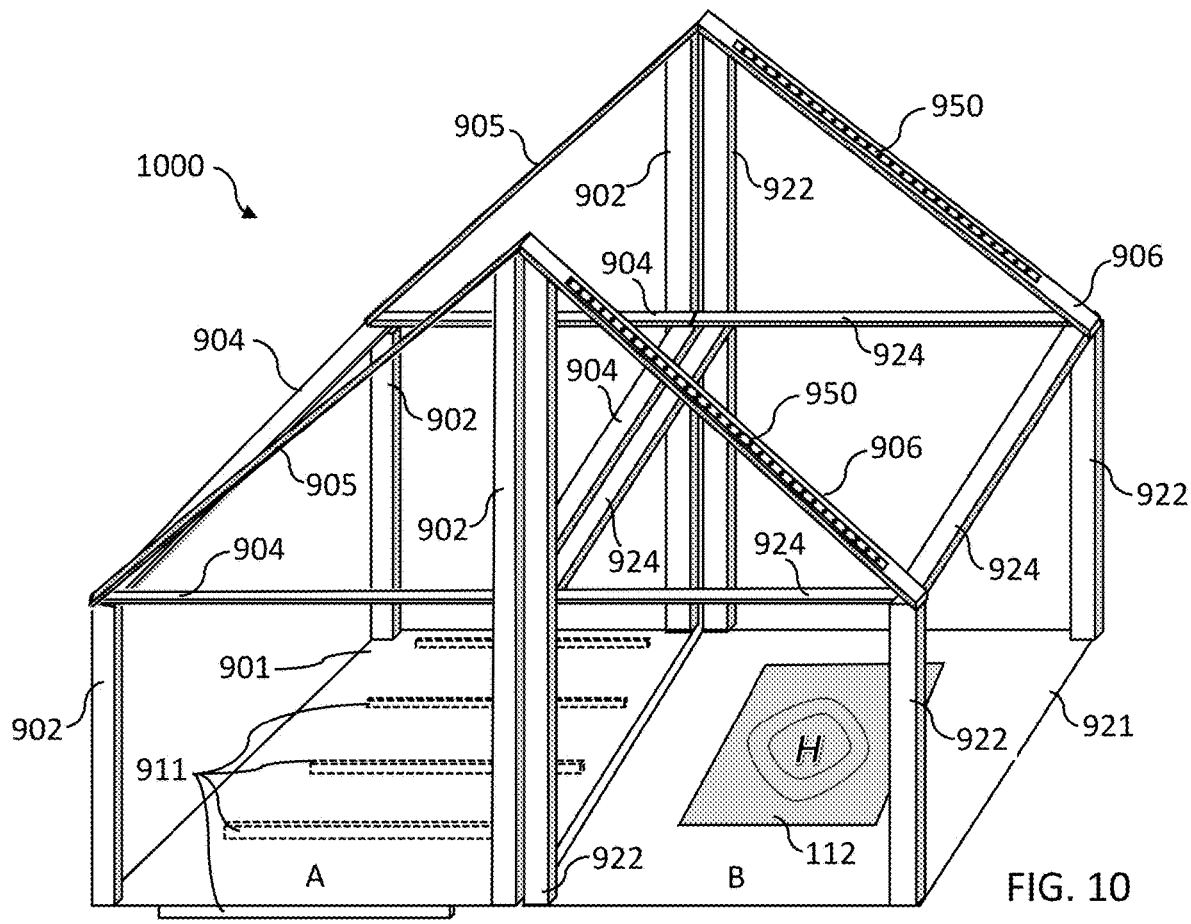
FIG. 10, depicts a top, side view of support framework for a housing that includes two separate spaced A and B, wherein a lift and retractable roof is only utilized in space B and each section A/B can are configured to be transported separately and attached together to create the two spaced A/B, according to one or more embodiments described.

Referring to FIG. 10, depicted is a top, side view of support framework for a housing 1000 that also includes two separate spaces A and B. In this FIG. 10 the two spaces A/B are shown as separately constructed and that can be attachable together. Such a scenario would be useful where the two section A/B are prefabricated and must be transported (carried by large truck) and located at a worksite. The sections A/B can each be, for example, fourteen feet wide, which is typically the width of pre-fabricated homes that are transported on roadways b large trucks. Once at the chosen site, sections A/B can be attached together. Section A can include floor 901 with vertical supports 902 extending upward from the floor 901 to horizontal supports 904, and then roof supports 905 can extend upward at a pitch from horizontal supports 904. Section B can include floor 921 with vertical supports 922 extending upward from the floor 921 to horizontal supports 924, and then roof support beams 906 can extend upward at a pitch from horizontal supports 924. Section B can have the opening roof if it serves as, for example, a shop. It can also have an optional lift platform 112. Section A may not require an opening roof if it serves as, for example, an office. Tracks 950 are shown attached to roof support beams 906 to movably secure roof panel 212 to the roof support beams 906 during opening, closing, closed and opened positions. Each section A/B can include transport beams 911 mounted beneath and supporting floors 901/921. Transport beams 911 can interface with equipment associated with a transport vehicle (e.g., a large commercial truck, not shown) capable of being loaded with and transporting large loads. All non-moving side panels, doors and any windows can be installed/constructed on sections A/B by methods knowns in the construction art.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art. As used herein in the claim(s), when used in conjunction with the word "comprising", the words "a" or "an" mean one or more.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

The invention claimed is:

1. A housing, comprising at least one roof panel movably attached to and resting on roof support beams, said at least one roof panel being movable from a closed position to an open position along the roof support beams to create an opening at a top of the housing and said at least one roof panel hinged to a side wall panel of the housing at rest against vertical support beams when the roof panel is in a closed position, wherein both the at least one roof panel and side wall panel move together with the at least one roof panel movably attached to roof support beams during movement to create the opening at the top of the housing as well as a side opening at a side of the housing associated with the side wall panel when the side panel moves away from the vertical support beams.

2. The housing of claim 1, further comprising a lift installed on a floor within the housing, said lift including a platform and at least one vertically movable extending post configured to move the platform above the floor toward the opening created at the top of the housing by movement of the at least one roof panel and side wall panel.

3. The housing of claim 1, further comprising two roof panels that are each hinged to a side wall panel of the housing, wherein the roof panels are configured to move apart from each other while also causing the side wall panels to move away from vertical support beams of the housing to create an opening at the top of the housing as well as side openings associated with each side wall panel.

4. The housing of claim 3, further comprising a lift installed on a floor within the housing, said lift including a platform and at least one vertically movable extending post configured to move the platform above the floor toward the opening created at the top of the housing by movement of the at least one roof panel and side wall panel.

5. The housing of claim 4, wherein the opening at the top of the housing caused by movement of the roof panels enables at least one of: receipt of an airborne vehicle into the housing, receipt of packaged delivered by airborne vehicles into the housing, and extra height above a ground floor within the housing for movement upward on a lift of materials, vehicles or people.

6. The housing of claim 4, wherein the lift is configured for movement up into the opening at the top of the housing caused by movement of the roof panels for at least one of: receipt of an airborne vehicle into the housing, receipt of packaged delivered by airborne vehicles into the housing, and extra height above a ground floor within the housing for movement upward on a lift of materials, vehicles or people.

7. The housing of claim 4, wherein the side wall moves away from vertical support beams of the housing to create space from which air generated by an airborne vehicle received within the housing can exit from inside the housing.

8. The housing of claim 1, wherein the opening at the top of the housing caused by movement of the roof panels enables at least one of: receipt of an airborne vehicle into the housing, receipt of packaged delivered by airborne vehicles into the housing, and extra height above a ground floor within the housing for movement upward on a lift of materials, vehicles or people.

9. A housing, comprising two roof panels each movably attached to and resting on roof support beams, said at least one roof panel being movable from a closed position to an open position along the roof support beams to create an opening at a top of the housing and said two roof panels each being hingebly connected to a side wall panel of the housing at rest against vertical support beams when the roof panels are in a closed position, wherein both the two roof panels and associated side wall panels hingebly connected to each of the two roof panels are adapted to move into opened and closed positions when the two roof panels move along the roof support beams to create or close an opening at the top of the housing as well as a side opening at sides of the housing associated with the side wall panels when the side panels move away from the vertical support beams.

10. The housing of claim 9, further comprising a lift installed on a floor within the housing, said lift including a platform and at least one vertically movable extending post configured to move the platform above the floor toward the opening created at the top of the housing by movement of the at least one roof panel and side wall panel.

11. The housing of claim 10, wherein the lift is configured for movement up into the opening at the top of the housing caused by movement of the roof panels for at least one of: receipt of an airborne vehicle into the housing, receipt of packaged delivered by airborne vehicles into the housing, and extra height above a ground floor within the housing for movement upward on a lift of materials, vehicles or people.

12. The housing of claim 9, wherein the opening at the top of the housing caused by movement of the roof panels enables at least one of: receipt of an airborne vehicle into the housing, receipt of packaged delivered by airborne vehicles into the housing, and extra height above a ground floor within the housing for movement upward on a lift of materials, vehicles or people.

13. The housing of claim 12, wherein the side walls move away from vertical support beams of the housing to create space from which air generated by an airborne vehicle received within the housing can exit from inside the housing.

14. A housing, comprising:
a floor;
vertical support beams extending upward from the floor;
horizontal support beams connecting the vertical support beams;
roof support beams extending upward from the horizontal support beams;
at least one roof panel movably attached to and resting on the roof support beams, said at least one roof panel being movable from a closed position to an open position along the roof support beams to create an opening at a top of the housing and said at least one roof panel hinged to a side wall panel of the housing at rest against at least one of the vertical support beam when the roof panel is in a closed position, wherein both the at least one roof panel and side wall panel hingedly connected to the at least one roof panel move together with the at least one roof panel movably attached to at least one of the roof support beams during movement to create the opening at the top of the housing as well as a side opening at a side of the housing associated with the side wall panel when the side panel moves away from the at least one vertical support beam.

15. The housing of claim 14, further comprising a lift installed on a floor within the housing, said lift including a platform and at least one vertically movable extending post configured to move the platform above the floor toward the opening created at the top of the housing by movement of the at least one roof panel and side wall panel.

16. The housing of claim 14, further comprising two roof panels that are each hinged to a side wall panel of the housing, wherein the roof panels are configured to move apart from each other while also causing the side wall panels to move away from at least one of the vertical support beams of the housing to create an opening at the top of the housing as well as side openings associated with each side wall panel.

17. The housing of claim 16, further comprising a lift installed on a floor within the housing, said lift including a platform and at least one vertically movable extending post configured to move the platform above the floor toward the opening created at the top of the housing by movement of the at least one roof panel and side wall panel.

18. The housing of claim 17, wherein the opening at the top of the housing caused by movement of the roof panels enables at least one of: receipt of an airborne vehicle into the housing, receipt of packaged delivered by airborne vehicles into the housing, and extra height above a ground floor within the housing for movement upward on a lift of materials, vehicles or people.

19. The housing of claim 14, wherein the opening at the top of the housing caused by movement of the roof panels enables at least one of: receipt of an airborne vehicle into the housing, receipt of packaged delivered by airborne vehicles into the housing, and extra height above a ground floor within the housing for movement upward on a lift of materials, vehicles or people.

* * * * *